(12) United States Patent
Weida et al.

(10) Patent No.: US 11,137,351 B2
(45) Date of Patent: Oct. 5, 2021

(54) TRACE CHEMICAL CONCENTRATION MEASUREMENT USING MID-INFRARED ABSORPTION SPECTROSCOPY IN A HIGHLY ABSORBING MEDIUM

(71) Applicant: DAYLIGHT SOLUTIONS, INC., San Diego, CA (US)

(72) Inventors: Miles James Weida, Poway, CA (US); Jeremy Rowlette, Escondido, CA (US)

(73) Assignee: DAYLIGHT SOLUTIONS, INC., San Diego, CA (US)

( * ) Notice: Subject to any disclaimer, the term of this patent is extended or adjusted under 35 U.S.C. 154(b) by 0 days.

(21) Appl. No.: 16/655,922

(22) Filed: Oct. 17, 2019

(65) Prior Publication Data
US 2020/0124527 A1    Apr. 23, 2020

Related U.S. Application Data

(60) Provisional application No. 62/749,436, filed on Oct. 23, 2018.

(51) Int. Cl.
*G01N 21/05*    (2006.01)
*G01N 21/3577*    (2014.01)

(52) U.S. Cl.
CPC ............... *G01N 21/3577* (2013.01); *G01N 2201/06113* (2013.01)

(58) Field of Classification Search
CPC ..... G01N 21/3577; G01N 2201/06133; G01N 21/341; G01N 21/39; G01J 3/00;
(Continued)

(56) References Cited

U.S. PATENT DOCUMENTS 6,737,651 B1    5/2004   Lendl
7,276,701 B2    10/2007  Lendl
(Continued)

OTHER PUBLICATIONS

Kolhed, Malin, "Assessment of quantum cascade lasers as mid infrared light sources for measurement of aqueous samples". Vibrational Spectroscopy, 2002. Research Gate.
(Continued)

*Primary Examiner* — David P Porta
*Assistant Examiner* — Mamadou Faye
(74) *Attorney, Agent, or Firm* — Roeder & Broder LLP; Steven G. Roeder

(57) ABSTRACT

A method for identifying one or more analytes (12A)(12B)(12C) includes (i) directing a solvent (18) into a test cell (22); (ii) directing a first laser probe beam (26) at the solvent (18) in the test cell (22); (iii) acquiring a solvent intensity spectrum of the solvent (18); (iv) directing a sample (12) that includes one or more analytes (12A)(12B)(12C) and the solvent (18) into the flow cell (22); (v) directing a second laser probe beam (26) at the sample (12) in the test cell (22); (vi) acquiring a sample intensity spectrum of the sample (12); (vii) calculating a solvent referenced transmittance spectrum that details a solvent reference transmittance as a function of wavelength using the solvent intensity spectrum and the sample intensity spectrum; and (viii) identifying one or more analytes (12A)(12B)(12C) in the sample (12) using the solvent referenced transmittance spectrum.

25 Claims, 7 Drawing Sheets

(58) Field of Classification Search
CPC ....... G01J 2003/2866; G01J 2003/2869; G01J 2003/2873
See application file for complete search history.

(56) References Cited

U.S. PATENT DOCUMENTS

| | | | |
|---|---|---|---|
| 9,784,958 | B2 | 10/2017 | Rowlette et al. |
| 10,437,032 | B2 | 10/2019 | Rowlette et al. |
| 10,437,033 | B2 | 10/2019 | Rowlette et al. |
| 2012/0197096 | A1* | 8/2012 | Ridder ................ A61B 5/1455 600/314 |
| 2015/0276588 | A1* | 10/2015 | Marshall ............... G01N 21/05 250/343 |
| 2018/0059005 | A1* | 3/2018 | Marshall ............... G01N 21/39 |

OTHER PUBLICATIONS

Schaden, S. et al., "Quantum cascade laser modulation for correction of matrix-induced background changes in aqueous samples". Appl. Phys. B 86, pp. 347-351, 2007.

Schaden, S. et al., "Direct Determination of Carbon Dioxide in Aueous Solution Using Mid-Infrared Quantum Cascade Lasers". Applied Spectroscopy, vol. 58, No. 6, pp. 667-670, 2004. Society for Applied Spectroscopy.

Quintas, Guillermo et al., "On-Line Fourier Transform Infrared Spectrometric Detection in Gradient Capillary Liquid Chromatography Using Nanoliter-Flow Cells". Analytical Chemistry, vol. 81, No. 10, pp. 3746-3753, 2009.

Brandstetter, Markus et al., "Tunable external cavity quantum cascade laser for the simultaneous determination of glucose and lactate in aqueous phase". Analyst, 2010. The Royal Society of Chemistry.

Kuligowski, J. et al., "Recent advances in on-line lkiquid chromatography—infrared spectrometry (LC-IR)". Trends in Analytical Chemistry, vol. 29 No. 6, pp. 544-552, 2010. Elsevier Ltd.

Kuligowski, J. et al., "High performance liquid chromatography with on-line dual quantum cascade laser detection for the determination of carbohydrates, alcohols and organic acids in wine and grape juice". Appl. Phys. B 99, pp. 833-840, 2010.

Lendl, B. et al., "Mid-IR quantum cascade lasers as an enabling technology for a new generation of chemical analyzers for liquids". Quantum Sensing and Nanophotonic Devices VIII, Proc. of SPIE vol. 7945, 794503, 2011.

Brandsetter, Markus et al., "Tunable mid-infrared lasers in physical chemosensors towards the detection of physiologically relevant parameters in biofluids". Sensors and Actuators B 170, pp. 189-195, 2012. Elsevier.

Beskers, Timo F. et al., "High performance liquid chromatography with mid-infrared detection based on a broadly tunable quantum cascade laser". Analyst, vol. 139, pp. 2057-2064, 2014. Royal Society of Chemistry.

Brandsetter, M. et al., "Measures for optimizing pulsed EC-QC laser spectroscopy of liquids and application to multi-analyte blood analysis". Vienna University of Technology, Vienna, Austria.

Alcaraz, Mirta R. et al., External-Cavity Quantum Cascade Laser Spectroscopy for Mid-IR Transmission Measurements of Proteins in Aqueous Solution. Analytical Chemistry, vol. 87, pp. 6980-6987, 2015. ACS Publications.

Vahlsing, T. et al., "Mid-infrared spectroscopic characterisation of an ultra-broadband tunable EC-QCL system intended for biomedical applications". Interdisciplinary Center for Life Sciences, Germany; Institute of Chemical Technologies and Analytics, Austria; RECENDT Research Center for Non Destructive Testing, Austria; Helmholtz Institute of Biomedical Engineering, Germany.

Schwaighofer, Andreas et al., "External cavity-quantum cascade laser infrared spectroscopy for secondary structure analysis of proteins at low concentrations". Scientific Reports, DOI: 10.1038, 2016.

* cited by examiner

TRACE CHEMICAL CONCENTRATION MEASUREMENT USING MID-INFRARED ABSORPTION SPECTROSCOPY IN A HIGHLY ABSORBING MEDIUM

RELATED APPLICATION

The present application claims priority on U.S. Provisional Application No. 62/749,436 filed on Oct. 23, 2019, and entitled "TRACE CHEMICAL CONCENTRATION MEASUREMENT USING MID-INFRARED ABSORPTION SPECTROSCOPY IN A HIGHLY ABSORBING MEDIUM". As far as permitted, the contents of U.S. Provisional Application No. 62/749,436 are incorporated herein.

BACKGROUND

Liquid sample analysis is an important field in a variety of industries, including bio-technology and pharmaceuticals where many products depend critically on measurements of exact concentrations of the different analytes present in solution. It is often desirable to make measurements on the liquid samples in their native state so as to not perturb the chemistry of fluid-specific properties of the analytes. Chemical identification of each analyte, as well as concentration measurements of each analyte are often desired. Concentration measurements need to be sensitive to trace levels of analytes (part per million to part per thousand levels) while allowing measurements of higher (percent level) concentrations as well. Moreover, liquid sample volumes can be quite small (10 µL), requiring small volume sample holders to make these measurements.

Infrared absorbance spectroscopy is one technique for identifying the presence of a chemical through its unique absorbance spectrum, and for also determining the concentration of that chemical through the amount of absorbance. Unfortunately, existing infrared absorbance spectroscopy system are not very sensitive to trace level of analytes in the sample, and/or take a relatively long time to accurately analyze the trace levels of analytes in the sample.

Thus, existing infrared absorbance spectroscopy systems are not able to accurately provide real time, identification of analytes and/or trace level concentration measurements of analytes in a sample.

SUMMARY

A method for analyzing a sample that includes one or more analytes and a solvent, includes (i) providing a test cell; (ii) directing a first laser probe beam at the test cell while the solvent is in the test cell, wherein a center wavelength of the first laser probe beam is varied over time (over a first time period); (iii) acquiring a solvent intensity spectrum for the solvent during the first time period while the first laser probe beam is directed at the test cell; (iv) directing a second laser probe beam at the test cell while the sample is in the test cell, wherein a center wavelength of the second laser probe beam is varied over time (during a second time period); (v) acquiring a sample intensity spectrum of the sample during the second time period while the second laser probe beam is directed at the test cell; and (vi) identifying at least one analyte using the solvent intensity spectrum and the sample intensity spectrum with a control and analysis system.

In one embodiment, the method includes calculating a solvent referenced transmittance spectrum that details a solvent referenced transmittance as a function of wavelength using the solvent intensity spectrum and the sample intensity spectrum. The sample referenced transmittance spectrum can be used to identify one or more analytes in the sample.

As an overview, in certain embodiments, the method is uniquely designed to provide accurate, real time, identification and trace level concentration measurements of one or more trace analytes in the sample. More specifically, the present invention utilizes a unique method to accurately calculate an analyte absorbance spectrum that is used to identify and provide trace level concentration measurements of the one or more trace analytes in the sample. The unique method allows for the analysis of the sample to be performed in a solvent that is highly absorbent to the wavelengths of the laser probe beam. The use of the solvent allows the sample to be tested in its native state so as to not perturb the chemistry of the fluid-specific properties of the one or more analytes.

Further, this unique method allows for the use of a high powered laser source, a more accurate detector system, and a relatively long path length of the test cell. These factors improve the sensitivity and accuracy of the system. As a result thereof, the system is sensitive to trace levels of analytes (part per million to part per thousand levels) while allowing measurements of higher (percent level) concentrations of analytes as well.

Additionally, the method can include calculating a displaced solvent absorbance spectrum and calculating an analyte absorbance spectrum that details the absorbance of the analyte as a function of wavelength using the solvent referenced transmittance spectrum and the displaced solvent absorbance spectrum. Further, the analyte absorbance spectrum is a linear combination of one or more of the analytes.

In one embodiment, the displaced solvent absorbance spectrum is calculated utilizing a component analysis to determine the displaced solvent absorbance spectrum. In another embodiment, the displaced solvent absorbance spectrum is calculated by recording a spectrum in a region where the analytes have no or very weak spectral features, then looking at the change in absorbance and taking it as due entirely to displaced solvent such that this displaced solvent spectrum can be added back in to spectral regions where the analytes do have stronger absorbance features.

As provided herein, each analyte will displace the same amount of solvent. Thus, the constant displaced solvent spectrum in with the analyte spectrum allows the resultant spectrum to be used in a component analysis such as linear least squares fitting to accurately determine analyte concentrations without having to further consider the displaced solvent spectrum.

In another embodiment, the present invention is directed to a spectroscopy system for analyzing a sample that includes one or more analytes and a solvent. The spectroscopy system can includes (i) a test cell; (ii) a laser source that directs a first laser probe beam at the test cell while the solvent is in the test cell, and a second laser probe beam at the test cell while the sample is in the test cell; (iii) a detector system that acquires a solvent intensity spectrum for the solvent while the first laser probe beam is directed at the test cell, and acquires a sample intensity spectrum of the sample while the second laser probe beam is directed at the test cell; and (iv) a control and analysis system that identifies at least one analyte using the solvent intensity spectrum and the sample intensity spectrum.

In this embodiment, the control and analysis system can calculate a solvent referenced transmittance spectrum that details a solvent referenced transmittance as a function of wavelength using the solvent intensity spectrum and the sample intensity spectrum. Further, the control and analysis system can use the sample referenced transmittance spectrum to identify at least one analyte.

In one embodiment, the control and analysis system calculates a displaced solvent absorbance spectrum and calculates an analyte absorbance spectrum that details the absorbance of the analyte as a function of wavelength using the solvent referenced transmittance spectrum and the displaced solvent absorbance spectrum. As provided herein, the analyte absorbance spectrum is a linear combination of one or more of the analytes.

The laser source can be controlled so that each laser probe beam has a broad and continuous intensity peak throughout an entire target wavelength range to average over etaloning and coherence effects.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
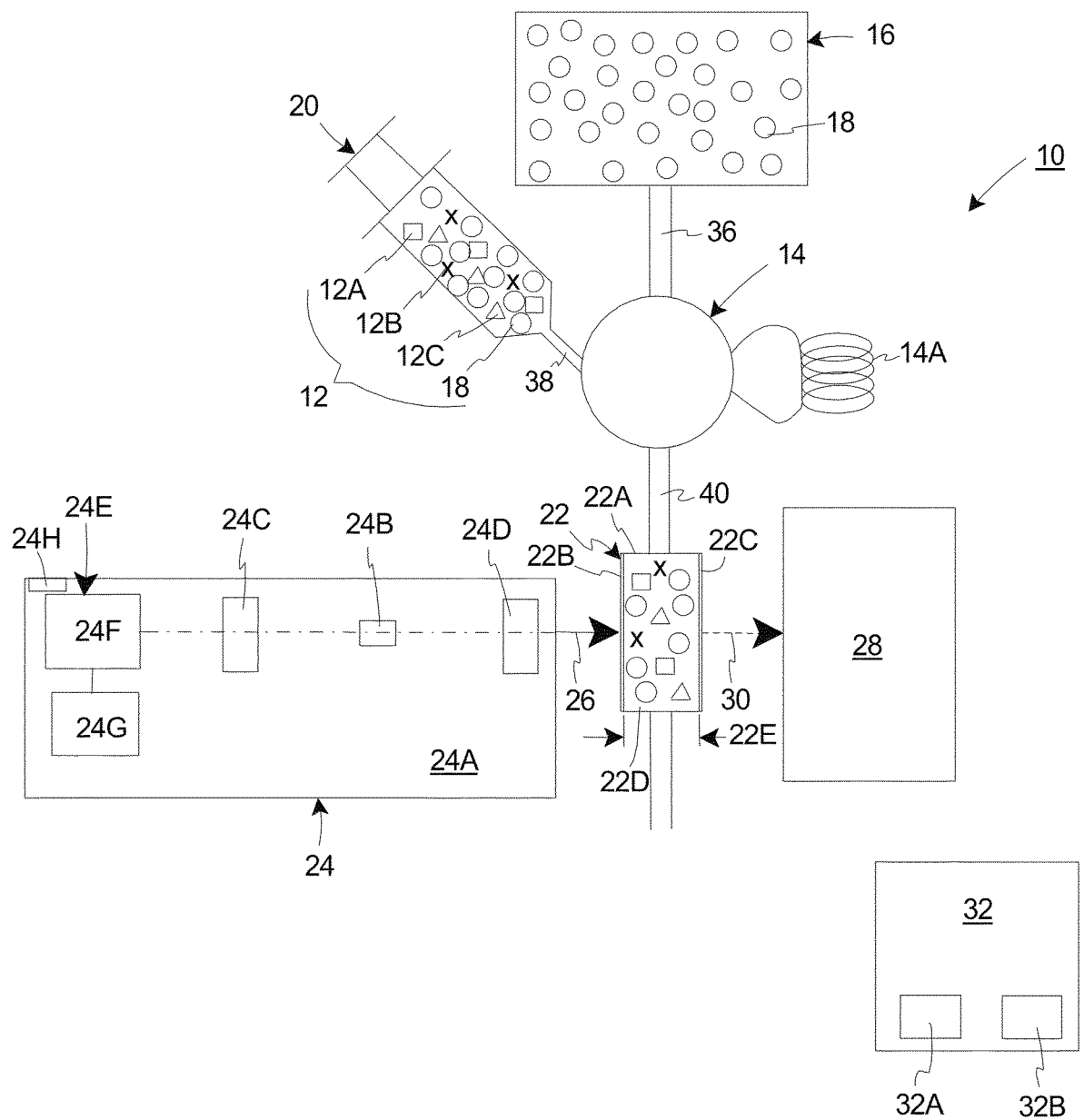
FIG. 1 is a simplified illustration of a spectroscopy system having features of the present invention.

FIG. 1 is a simplified schematic of an absorbance spectroscopy system 10 for spectrally analyzing a sample 12 that includes one or more trace analytes 12A, 12B, 12C. The design of the spectroscopy system 10 can be varied pursuant to the teachings provided herein. In the non-exclusive embodiment illustrated in FIG. 1, the spectroscopy system 10 includes (i) an injection valve 14 having an injection loop 14A, (ii) a solvent delivery system 16 that delivers a solvent 18 (represented with small circles) that is used in the spectral analysis; (iii) a sample injector 20; (iv) a test cell 22; (v) a laser source 24 that directs a laser probe beam 26 at the test cell 22; (vi) a detector system 28 that detects an identifying detected beam 30 from the test cell 22; and (vii) a control and analysis system 32 that controls the components of the spectroscopy system 10. Alternatively, the spectroscopy system 10 can be designed to include more than or fewer components than are illustrated in FIG. 1.

As an overview, in certain embodiments, the spectroscopy system 10 is uniquely designed to provide accurate, real time, identification and trace level concentration measurements of one or more trace analytes 12A, 12B, 12C in the sample 12. More specifically, the present invention teaches, and the control and analysis system 32 utilizes a unique method to accurately calculate an absorbance spectrum that is used to identify and provide trace level concentration measurements of the one or more trace analytes 12A, 12B, 12C in the sample 12. The unique method allows for the analysis of the sample 12 to be performed in a solvent that is highly absorbent to the wavelengths of the laser probe beam 26. The use of the solvent allows the sample 12 to be tested in its native state so as to not perturb the chemistry of the fluid-specific properties of the one or more analytes 12A, 12B, 12C.

Further, this unique method allows for the use of a high powered laser source 24, a more accurate detector system 28, and a relatively long path length 22E of the test cell 22. These factors improve the sensitivity and accuracy of the spectroscopy system 10. As a result thereof, the spectroscopy system 10 is sensitive to trace levels of analytes 12A, 12B, 12C (part per million to part per thousand levels) while allowing measurements of higher (percent level) concentrations of analytes 12A, 12B, 12C as well. As alternative, non-exclusive examples, the spectroscopy system 10 can be used to measure levels of analytes 12A, 12B, 12C that are less than 10, 5, 2, 1, 0.75, 0.5, 0.4, 0.3, 0.2, 0.1 percent of the sample 12.

The type of sample 12 being analyzed can be varied. Moreover, the number and concentration of trace analytes 12A, 12B, 12C in the sample 12 can also be varied. In the non-exclusive embodiment illustrated in FIG. 1, the sample 12 is a fluid (more specifically a liquid) that includes three trace analytes, namely a first analyte 12A (represented with rectangles), a second analyte 12B (represented with x's), and a third analyte 12C (represented with triangles). Alternatively, the sample 12 can include more than three or fewer than three analytes 12A-12C. Additionally, in FIG. 1, the sample 12 also includes the solvent 18 mixed with the analytes 12A, 12B, 12C.

As non-exclusive examples, the sample 12 can be a liquid, a complex sample of multiple liquids, or a complex sample of liquids, dissolved chemicals, and/or solids. Non-exclusive examples of samples 12 that can be analyzed with the spectroscopy system 10 include, but are not limited to glucose, proteins, amino acids, polysaccharides, or lactates.

The injection valve 14 is used to direct a slug or aliquot of the sample 12 to the test cell 22 to be spectrally analyzed. In FIG. 1, the spectroscopy system 10 includes (i) a solvent conduit 36 that connects the solvent deliver system 16 in fluid communication with the injection valve 14; (ii) a sample conduit 38 that connects the sample injector 20 in fluid communication with the injection valve 14; and (iii) a cell conduit 40 that connects the injection valve 14 in fluid communication with the test cell 22. With this design, the injection valve 14 is controlled to direct the flowing clean solvent 18 from the solvent delivery system 16 to the test cell 22, and subsequently inject a slug of sample 12 (that includes the solvent 18 and the analytes 12A, 12B, 12C) to the test cell 22 for analysis the solvent 18.

The design of the solvent delivery system 16 can be varied. For example, the solvent delivery system 16 can include one or more reservoirs (not shown) for the solvent 18, one or more fluid pumps (not shown), and/or one more flow regulators (not shown).

The type of solvent 18 utilized by the spectroscopy system 10 can be varied according to the type of sample 12. As non-exclusive examples, suitable solvents 18 include (but are not limited to) water, phosphate-buffered saline (PBS) solution, dimethyl sulfoxide (DMSO), isopropyl alcohol, methyl alcohol, toluene, or tetrahydrofuran (THF).

In certain embodiments, the solvent 18 is highly absorbing to the wavelengths of the laser probe beam 26. In alternative, non-exclusive embodiments, the solvent 18 utilized absorbs at least 50, 60, 70, 80, 90, 95, or 99 percent at certain wavelengths of the probe beam 26 in the test cell 22.

The design of the sample injector 20 can be varied. In certain embodiments, the sample injector 20 is a syringe type device that can inject small volumes of the sample 12 into the injection loop 14A of the injection valve 14. For example, in alternative, non-exclusive embodiments, the sample injector 20 can be designed to inject less than one hundred, eighty, fifty, twenty or ten microliters of undifferentiated sample 12 into the injection loop 14A.

The test cell 22 provides an area for spectral analysis of the solvent 18 and the sample 12. The design of the test cell 22 can be varied. In one embodiment, the solvent 18 and the sample 12 are directed to and flows though the test cell 22 at a substantially constant flow rate during the spectral analysis. Non-exclusive examples of suitable flow rates through the test cell 22 include, but are not limited to 0.1, 0.2, 0.5, 0.7, 1.0, 2.0, 5.0, or 10.0 mL/min.

Alternatively, the flow rate of the solvent 18 and the sample 12 that are directed to and flow through the test cell 22 can be varied during the spectral analysis. In the simplified embodiment illustrated in FIG. 1, the solvent deliver system 16 and/or the sample injector 20 control the flow rate through the test cell 22. Alternatively, the flow rate through the test cell 22 can be controlled in a different fashion than illustrated in FIG. 1.

It should be noted that the design of the test cell 22 can be varied according to the type of sample 12 and the wavelengths of the probe beam 26. For example, the test cell 22 can be designed for use with a mid-infrared probe beam 26.

In one, non-exclusive embodiment, the test cell 22 includes a rigid cell body 22A, an input window 22B and an output window 22C that is spaced apart from the input window 22B. With this design, the cell body 22A and the windows 22B, 22C cooperate do define a flow chamber 22D that receives the flowing solvent 18 and sample 12. Further, with this design, the laser probe beam 26 is directed through the input window 22B into the flow chamber 22D, and the identifying detected beam 30 exits the flow chamber 22 via the output window 22C. In the embodiment where the probe beam 26 is a mid-infrared beam, the widows 22B, 22C are transmissive to light in the mid-infrared range.

In FIG. 1, the distance between the windows 22B, 22C defines the path length 22E of the test cell 22. It should be noted that the spectroscopy system 10 provided herein is uniquely designed to allow for a relatively long path length 22E. Generally speaking, longer path lengths 22E allow for improved sensitivity of the spectroscopy system 10 to trace analytes 12A, 12B, 12C. As not exclusive examples, the test cell 22 can be designed to have a path length 22E of at least 300, 250, 200, 150, 100, 50, or 20 microns.

Moreover, as alternative, non-exclusive examples, the test cell 22 can be a micro flow cell having a volume of less than 20, 10, 5, 4, 3, 2, 1, 0.5, or 0.1 microliters.

Alternatively, the test cell 22 can be designed so that the window 22C is reflective. In this design, the laser probe beam 26 is directed through the input window 22B into the flow chamber 22D, reflected off of the window 22C, and the identifying detected beam 30 exits the flow chamber 22 via the window 22B. In this design, the probe beam 26 makes two passes through the flow chamber 22.

The laser source 24 directs the laser probe beam 26 at the test cell 22. The design of the laser source 24 can be varied to suit the requirements of the sample 12. In one embodiment, the laser source 24 is a mid-infrared laser that is designed to directly emit a substantially temporally coherent laser probe beam 26 having a center wavelength that is in the mid-infrared ("MIR") range. As used herein, the term "MIR range" shall mean and include the spectral region or spectral band of between approximately five thousand to five hundred wavenumbers (5000-500 $cm^{-1}$), or approximately two and twenty micrometers (2-20 μm) in wavelength. The mid-infrared range is particularly useful to spectroscopically interrogate samples 12 that are comprised of molecules or groups of molecules that have fundamental vibrational modes in the MIR range, and thus present strong, unique absorbance signatures within the MIR range.

In one embodiment, the laser source 24 is designed to have a relatively high power and a tightly controlled beam size. This allows for longer path lengths 22E through highly absorbing solvents 18 to be probed while preserving enough optical power to provide a useful signal at the detector system 28 for analysis of the solvent 18 and the sample 12. As alternative, non-exclusive examples, the laser source 24 is designed so that the laser probe beam 26 has an optical power of at least 1, 10, 20, 50 or 100 mW.

Further, in one embodiment, the laser source 24 is tunable so that a center wavelength of the probe beam 26 is varied ("tuned") over time over a target wavelength range. Stated in another fashion, the laser source 24 can be tuned to different center wavelengths over time. In FIG. 1, the tunable laser source 24 has an external cavity, Littrow configuration. As a non-exclusive example, the laser source 24 can be tunable, and have a target wavelength range that spans the entire or just a portion of the MIR range. More specifically, in alternative, non-exclusive examples, the laser source 24 can be designed so that target wavelength range spans at least 10, 20, 30, 40, 50, 60, 70, 80, 90 or 100 percent of the MIR range.

Still alternatively, the laser source 24 can include multiple lasers, with each laser be tunable over a different (and in some embodiments, partly overlapping) portion of the MIR range.

In FIG. 1, the laser source 24 also includes (i) a rigid laser frame 24A, (ii) a semiconductor gain medium 24B, (iii) a cavity optical assembly 24C, (iv) an output optical assembly 24D, and (v) a tunable frequency selective element assembly 24E. The design of each of these components can be varied. Further, the laser source 24 can be designed with more or fewer components than illustrated in FIG. 1.

For example, the gain medium 24B can be a quantum cascade device that directly emits the laser probe beam 26 without any frequency conversion. In FIG. 1, the quantum cascade device 24B emits from an output facet and a cavity facet along a lasing axis. The laser probe beam 26 exits from the output facet.

The cavity optical assembly 24C is positioned between the quantum cascade device 24B and the frequency selective element assembly 24E along the lasing axis, and collimates and focuses the light that passes between these components.

For example, the cavity optical assembly 24C can include a single lens or more than one lens.

The output optical assembly 24D is positioned along the lasing axis. In this design, the output optical assembly 24D collimates and focuses the laser probe beam 26 that exits the output facet of the gain medium 24B. For example, the output optical assembly 24D can include a single lens or more than one lens.

The frequency selective element assembly 24E reflects the light back to the gain medium 24B, and is used to precisely select and adjust the lasing frequency (wavelength) of the external cavity and the center optical wavelength of the laser probe beam 26. Stated in another fashion, the frequency selective element assembly 24E is used to feed back to the gain medium 24B a relatively narrow band optical frequency which is then amplified in the gain medium 24B. With the external cavity arrangement illustrated in FIG. 1, the frequency selective element assembly 24E dictates what optical frequency (wavelength) will experience the most gain and thus dominate the optical wavelength of the laser probe beam 26.

A number of alternative embodiments of the frequency selective element assemblies 24E can be utilized. In one, non-exclusive embodiment, the frequency selective element assembly 24E includes a diffraction grating 24F and a grating mover 24G (e.g. a voice coil actuator) that selectively moves (e.g., rotates) the diffraction grating 24F to selectively adjust the lasing wavelength of the gain medium 24B. For example, the grating mover 24G can rapidly pivot the grating 24F angle at a high rate (e.g. 30-1500 hertz) to adjust the center wavelength over time through the tunable wavelength range. The position of the diffraction grating 24F can be continuously monitored with a measurement system 24H (e.g. an optical encoder) to provide for closed loop control of the grating mover 24G. With this design, the center wavelength of the laser probe beam 26 can be selectively adjusted over time in a closed loop fashion.

For certain spectroscopy applications, the laser source 24 described above can have the undesirable property of a relatively narrow linewidth (often <1.0 $cm^{-1}$ in width), and some sharp peaks in intensity at certain wavelengths. The sharp spectral intensity peaks have several undesirable effects in small volume liquid sample 12 measurements for highly absorbing solvents 18. First, the optical path lengths 22E that can be probed in highly absorbing solvents 18 are typically quite small, (20 to 200 microns). The highly temporal coherent laser probe beams 26 present in quantum cascade lasers 24 readily create interference patterns known as etaloning between the sample windows 22B, 22C for the test cell 22, and within the windows 22B, 22C themselves. Because the sample 12 volumes and cells 22 tend to be small (1 μL to 50 μL) to minimize sample 12 volume, it is not possible to employ coatings or optical wedges to remove all these effects, and they show up as intensity modulations in the recorded spectra by the detector system 28. Further, laser sources 24 with a sharp intensity peak at at least one wavelength are prone to drifting signal levels as the amount of constructive and destructive interference from these etalons changes, chiefly due to thermal and mechanical drifts within the system.

As provided herein, to defeat these effects, the control and analysis system 32 controls the laser source 24 and/or the detector system 28 so that the laser source 24 effectively does not have sharp intensity peaks at one or more wavelengths in the tunable range. Instead, the laser source 24 can be controlled so that the probe beam 26 has a range of wavelengths that is continuous and broad enough to cancel out, or average over the etalons that typically show up in small volume flow cells. As alternative, non-exclusive embodiments, the laser source 24 and/or the detector system 28 can be controlled and designed so that the probe beam 26 has a range of wavelengths of 2 $cm^{-1}$, 4 $cm^{-1}$, 8 $cm^{-1}$, or 16 $cm^{-1}$. There are different techniques that can be used to average out or smear out the sharp wavelengths of the laser source 24 while the data is being collected. For example, the wavelength of the laser source 24 can be dithered (e.g. by significantly moving the frequency selective element assembly 24E (tuning element)) during the capturing of the data. Alternatively, numerical averaging of discrete wavelength measurements can be performed. These wavelength ranges help cancel coherence effects, and are comparable to the spectral features observed for analytes 12A, 12B, 12C in the sample 12 so as to preserve spectral identification. Such a broader laser source 24 also allows spectra to be recorded with higher fidelity and less frequency noise susceptibility when tuning over broad (>100 $cm^{-1}$) spectral ranges.

The detector system 28 detects the identifying detected beam 30 that exits from the test cell 22. Stated in another fashion, the detector system 28 detects the light intensity that is transmitted through the solvent 18 and the sample 12. In this example, the laser probe beam 26 from the laser source 24 is absorbed by the molecules in the solvent 18 and sample 12 along the path length 22E. The design of the detector system 28 can be varied to suit the wavelength of the laser prove beam 26. As a non-exclusive example, the detector system 28 can include a thermoelectrically cooled, photovoltaic, InAsSb (indium arsenide antimonide) detector. Alternatively, another type of detector system 28 can be utilized.

Typically, the detector system 28 captures the identifying detected beam 30 during a capture time. As alternative, non-exclusive embodiments, the capture time can be 100, 200, 500, 1000, or 5000 microseconds.

In certain embodiments, the detector system 28 includes a plurality of pixels (e.g. arranged in a two dimensional array), with each pixel capturing information that can be used to create a MIR image during each capture time. The term "image" as used herein shall mean and include a two-dimensional photograph or screen display, or a two-dimensional array of data collected by the pixels.

As provided above, the present invention teaches, and the control and analysis system 32 utilizes a unique method to accurately calculate an absorbance spectrum that is used to identify and provide trace level concentration measurements of the one or more trace analytes 12A, 12B, 12C in the sample 12. This unique method allows for the capturing of intensities that are easily within the dynamic range of commonly available, existing detector systems 28.

The control and analysis system 32 controls the components of the spectroscopy system 10, and uniquely analyzes the sample 12 to provide accurate, real time, identification and trace level concentration measurements of one or more trace analytes 12A, 12B, 12C in the sample 12. More specifically, the control and analysis system 32 can control the operation of the solvent delivery system 16, the sample injector 20, the tunable laser source 24, and the detector system 28. The control and analysis system 32 can include one or more processors 32A and/or one or more electronic storage devices 32B. In FIG. 1, the control and analysis system 32 is illustrated as a single system. Alternatively, the control and analysis system 32 can be a distributed system.

In one embodiment, the control and analysis system 32 can control the laser drive current/voltage to the gain medium 24B, and the frequency selective element assembly 24E to control the center wavelength of the laser probe beam 26. Stated in another fashion, the control and analysis system 32 can control the position of the diffraction grating 24F via the grating mover 24G so that the center wavelength of the probe beam 26 is varied over time over the tunable wavelength range. For example, the laser source 24 can be tuned, and one or more pulses can be generated so that the probe beam 26 has approximately the same first center wavelength ("first target wavelength") for a first period of time. Subsequently, the laser source 24 can be tuned, and one or more pulses can be generated so that the probe beam 26 has approximately the same second center wavelength ("second target wavelength") that is different from the first center wavelength for a second period of time. Next, the laser source 24 can be tuned, and one or more pulses can be generated so that the probe beam 26 has approximately the same third center wavelength ("third target wavelength") that is different from the first and second target wavelengths for a third period of time. This process can be repeated for a plurality of additional target wavelengths throughout a portion or the entire tunable wavelength range. As non-exclusive examples, the number of pulses at each discrete target wavelength can be 1, 5, 10, 50, 100, 200, 500, 1000, 10,000 or more.

The number of discrete target wavelengths can also vary. As non-exclusive examples, the number of discrete target wavelengths can be approximately 1, 2, 3, 4, 5, 6, 7, 8, 9, 10, 15, 20, 25, 40, 200, 226, 400, 552 or 4000 within the tunable wavelength range.

As non-exclusive examples, the control and analysis system 32 can control the frequency selective element 24 so that the sweep rates across the entire tunable wavelength range is less than 1 millisecond, 10 millisecond, 100 millisecond, 1 second, 10 seconds, or 100 seconds.

As discussed in more detail below, the control and analysis system 32 can control the laser source 24 and/or the detector system 28 in a fashion so that the laser source 24 effectively does not have sharp intensity peaks at one or more (or all) of the target wavelengths in the tunable wavelength range.

Further, the control and analysis system 32 can control the detector system 28 to capture the intensity of the detected beam 30 at the appropriate times to generate an intensity spectrum in which the intensity varies as a function of wavelength. For example, the control and analysis system 32 can control the detector system 28 to capture the intensity of the detected beam 30 at each target wavelength, and the intensity at each target wavelength can be used to generate the intensity spectrum.

Moreover, as provided above, the control and analysis system 32 utilizes a unique method to accurately calculate an absorbance spectrum using the detected beam 30. The absorbance spectrum can be used to identify and provide trace level concentration measurements of the trace analytes 12A, 12B, 12C in the sample 12.

Figure 2:
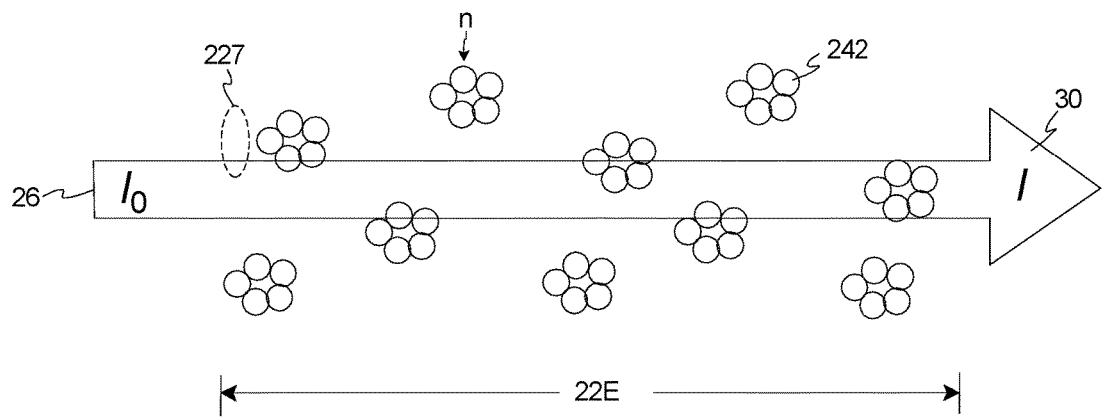
FIG. 2 is a simplified schematic of a plurality of molecules with key parameters for making a measurement of absorbance of the molecules.

The unique method is described with initial reference to FIG. 2, which is a simplified schematic of a plurality of molecules 242 with key parameters for making a measurement of absorbance of the molecules 242. In general, the attenuation of the probe beam 26 is governed by (i) the propensity of each molecule 242 (of the solvent and/or sample) to absorb a photon (called the absorbance cross section ("σ") 227 (illustrated with a dashed oval)), (ii) the concentration ("n") of molecules 242, and (iii) the path length ("$\ell$") 22E through the molecules. The incident intensity of the probe beam 26 from the laser source 24 (illustrated in FIG. 1) can be defined as "$I_0$", and the final intensity of the identifying detected beam 30 that is incident on the detector system 28 (illustrated in FIG. 1) can be defined as "I".

The amount of attenuation of the molecules 242 can be described by the transmittance ("T"), which can be calculated by dividing the final intensity by the incident intensity ($T=I/I_0$). The transmittance can range from zero ("0") for complete attenuation, to one ("1") for no attenuation of the probe beam 26. Transmittance is sometimes converted to obtain percent absorbance=100× (1−T).

It should be noted that the transmittance of the molecules 242 will vary as a function of wavelength of the probe beam 26 because different molecules 242 have different absorbance profiles in the mid-infrared range.

In certain embodiments, spectroscopy measurements convey the most information when the Beer-Lambert law is applied. The Beer-Lambert law relates to the attenuation to the fundamental quantities of the absorbance cross section ("σ"), the molecule concentration ("n"), and the path length ("$\ell$") through a quantity called the absorbance ("A") as provided below:

$$I=I_0 e^{-A}, \text{ where } A=\sigma n \ell. \quad \text{Equation (1)}$$

With a little math performed on Equation (1), the absorbance A can be calculated from the transmittance T via as provided below:

$$A=\ln(1/T). \quad \text{Equation (2)}$$

It should be noted that the absorbance calculated via the natural log is known as Naperian absorbance. Absorbance calculated with respect to $\log_{10}$ is known as decadic absorbance. Only Naperian absorbance is used in this description, although it is possible to convert to decadic absorbance simply by dividing the Naperian absorbance by ln(10)= 2.3026.

Absorbance is linear in path length and concentration. Thus, it is possible to linearly combine the absorbance spectra of two or more different analytes 12A, 12B, 12C (illustrated in FIG. 1). Likewise, it is possible to take changing path length into account in a linear fashion. This means that converting the raw measured transmittance to absorbance via Equation 2 is a necessary first step to determine concentrations, or perform an analysis that considers combining spectra for multiple chemicals.

As provided herein, absorbance and transmittance are quite linear with respect to each other over a small range. For example, 0.00 to 0.100 absorbance corresponds to 1.000 to 0.905 transmittance. However, the relationship becomes increasingly non-linear outside this range. For example, transmittance of 0.10 corresponds to an absorbance of 2.30, more than 2.5 times the amount expected for a linear relationship.

Unfortunately, the nonlinear relationship between transmittance (the measured quantity) and absorbance (the calculated quantity needed to convert transmittance to concentrations of analytes) can lead to problematic effects with system noise when transmittance values less than 0.10 are reached. Because the spectroscopy system 10 is used to measure transmittance (via intensity), the noise is specified in root-mean-square (rms) transmittance. For low absorbance signals (<0.1), the fractional transmittance noise is similar to the fractional absorbance noise. However, due to the nonlinear nature of the absorbance calculation, the fractional noise for higher absorbance grows with respect to the fractional transmittance noise.

For example, consider a system noise of 0.001 rms transmittance. For a measurement of 0.9 transmittance, this leads to an absorbance of 0.1054 with an uncertainty due to the transmittance noise of +/−0.0011. Taking the ratio of these values leads to an absorbance SNR (signal-to-noise-ratio) of 94.8. This absorbance SNR increases as the transmittance decreases from 1.00 to about 0.35.

Figure 3:
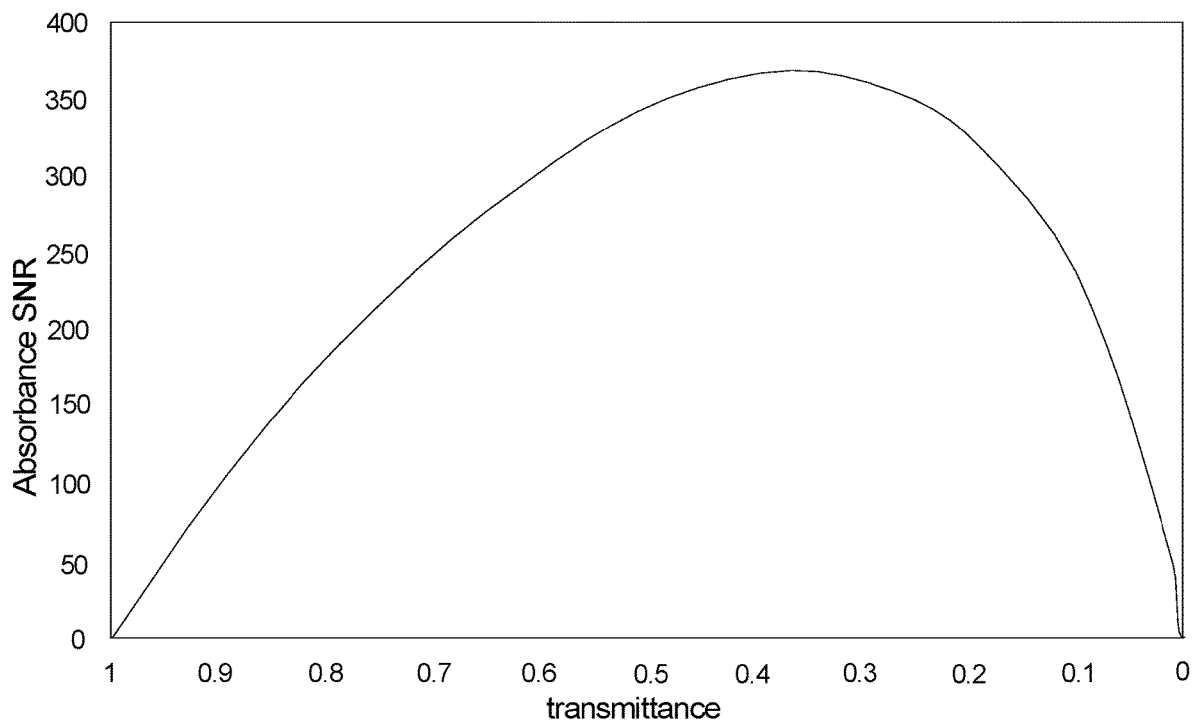
FIG. 3 is a graph that illustrates calculated absorbance signal-to-noise ratio ("SNR") as a function of measured transmittance for a system noise of 0.001 rms transmittance.

FIG. 3 is a graph that illustrates calculated absorbance signal-to-noise ratio ("SNR") as a function of measured transmittance for a system noise of 0.001 rms transmittance. As can be seen in FIG. 3, for very low transmittances (e.g. less than 0.1), the absorbance SNR plummets, and eventually the unphysical situation is reached where the magnitude of transmittance noise is greater than the transmittance, resulting in negative measured transmittance and exploding (i.e. undefined) absorbance measurements. The net effect of this nonlinearity is that concentration sensitivity from transmittance measurements decreases quickly for low transmittances to the point where there is almost no sensitivity to concentration for the highest, nearly saturated absorbances.

It should be noted that if the absorbance spectroscopy measurements are carried out in the gas phase, it is not very difficult to achieve a high transmittance with a good absorbance SNR. In these situations, the majority of the gas is air, which consists predominately of oxygen and nitrogen molecules that possess no significant absorbance in the infrared spectral region. As a result thereof, the path length is the primary parameter that is adjusted to achieve an ideal transmittance (>0.1 transmittance for example from FIG. 3) that maximizes absorbance SNR and allows for the most sensitive concentration measurements.

Figure 4:
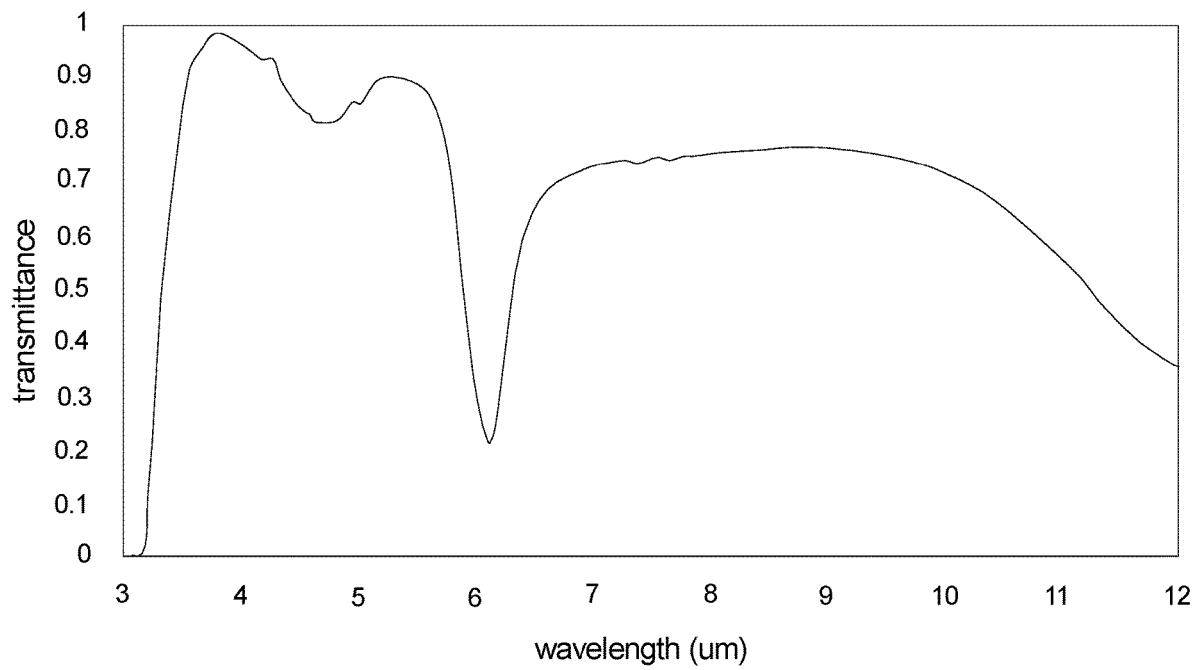
FIG. 4 is a graph that illustrates a transmittance spectrum of liquid water for a path length of five microns.
Figure 5:
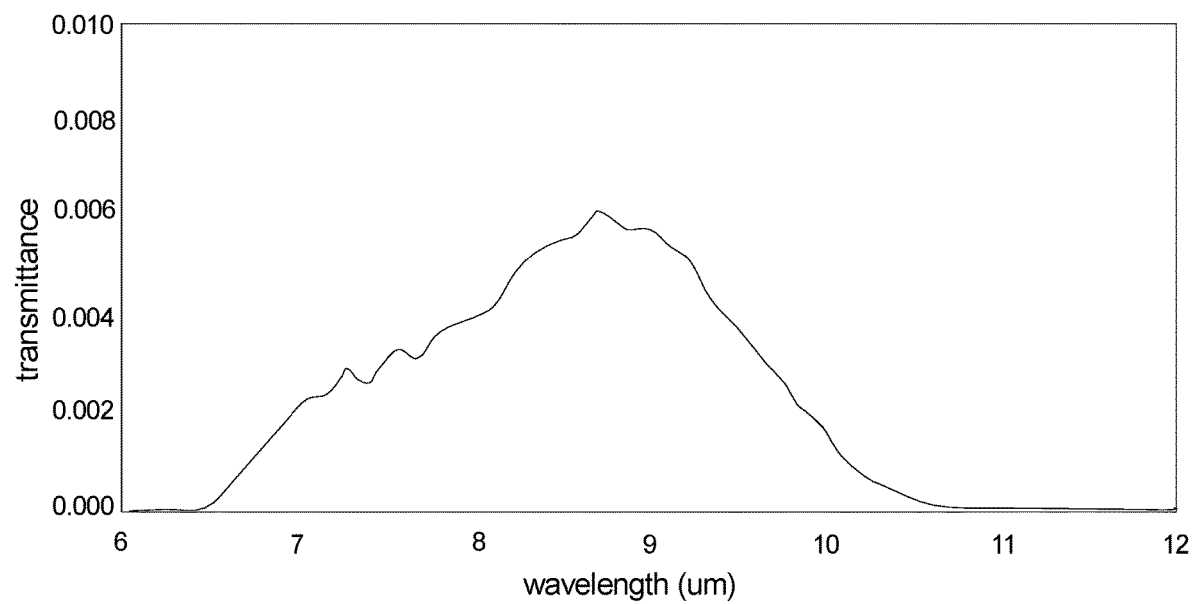
FIG. 5 is a graph that illustrates a transmittance spectrum of liquid water for a path length of one hundred microns.

However, absorbance spectroscopy in liquids or highly infrared absorbing background gases presents a different set of problems. Consider the transmittance spectrum of mid-infrared light in liquid water as illustrated in FIGS. 4 and 5. More specifically, FIG. 4 is a graph that illustrates the mid-infrared transmittance spectrum of liquid water for a path length of five microns, and FIG. 5 is a graph that illustrates the mid-infrared transmittance spectrum of liquid water for a path length of one hundred microns. As illustrated in FIG. 4, even at path lengths as short as five microns there is significant attenuation of the mid-infrared light by the liquid water. Further, as illustrated in FIG. 5, at a path length of one hundred microns, the transmittance of the water is only about 0.003 in the eight to ten micron wavelength region. The eight to ten micron wavelength range is where many chemicals such as sugars have strong spectral signatures.

One method for dealing with highly absorbing solvents is to limit the path length of the test cell to avoid the problem with very low transmittance. This method is not preferred because, as the path length decreases, the sensitivity to trace analytes decreases, and likelihood of clogging of the test cell increases. Further, transmittance noise levels of 0.001 root mean square (rms) are quite common in spectroscopic instrumentation, meaning that if the background solvent accounts for the majority of the transmittance reduction, the remaining transmittance is both in the non-linear limit described above where absorbance noise explodes, and the fractional amount of noise compared to the trace solvent spectra is quite high.

Another method for improving the sensitivity has been through sample modulation techniques during testing. This can involve techniques such as modulating the properties (e.g. pH) and/or amount of the sample. This method is also not preferred because (i) it can be quite slow (tens of seconds per wavelength), (ii) the system is required to be more complex, and (iii) the system is not able to able to analyze multiple analytes to determine concentrations of each.

In contrast, the present invention teaches, and the control and analysis system 32 (illustrated in FIG. 1) utilizes a unique method to accurately calculate an absorbance spectrum that is used to identify and provide trace level concentration measurements of the one or more trace analytes 12A, 12B, 12C in the sample 12.

As an overview of the unique method, first, the spectroscopy system 10 acquires a solvent intensity spectrum of the pure solvent 18 that details how the solvent intensity varies as a function of wavelength for the target wavelength range. Next, the spectroscopy system 10 acquires a sample intensity spectrum of the sample 12 that details how the sample intensity varies as a function of wavelength for the same target wavelength range.

Subsequently, the control and analysis system 32 calculates a solvent referenced transmittance spectrum that details a referenced transmittance as a function of wavelength for the same target wavelength range using the data from the solvent intensity spectrum and the data from the sample intensity spectrum. Alternatively or additionally, the control and analysis system 32 can calculate a solvent referenced absorbance spectrum that details a referenced absorbance as a function of wavelength for the same target wavelength range using the data from the solvent intensity spectrum and the data from the sample intensity spectrum. Next, the control and analysis system 32 calculates a displaced absorbance spectrum of the displaced solvent that details how the absorbance spectrum of the displaced solvent varies as a function of wavelength for the same target wavelength range. Finally, the control and analysis system 32 identifies one or more analytes in the sample using data from the solvent referenced transmittance spectrum (and/or the solvent references absorbance spectrum) and the displaced absorbance spectrum.

It should be noted that this unique method allows for the analysis of the sample 12 to be performed in a solvent that is highly absorbent, because only the data for the solvent intensity spectrum and the sample intensity spectrum are acquired. The present method does not rely on a background intensity spectrum which measures intensity with nothing in the test cell. The background intensity spectrum would result in very large intensities required to be measured by the detector system. With trace analytes, there is typically only a relatively small difference between the data for the solvent intensity spectrum and the sample intensity spectrum. As a result thereof, the intensities required to be measured by the detector system 28 easily fit within the dynamic range of exiting detectors 28. Further, with this method, the detector system 28 is sensitive to trace chemicals added to the liquid solvent.

Figure 6A:
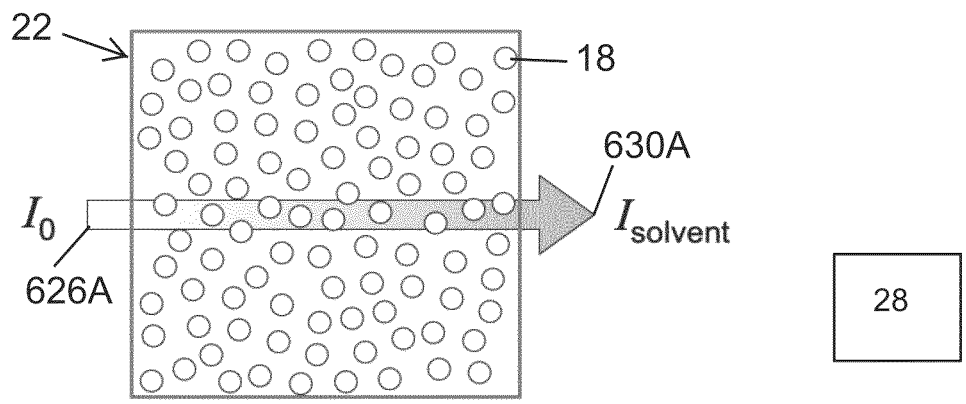
FIG. 6A is a simplified schematic of a solvent in a test cell with a probe beam and a detected beam.

The mathematical support for the unique method disclosed herein for identifying and estimating the concentrations of one or more analytes is provided with initial reference to FIG. 6A. More specifically, FIG. 6A is a simplified schematic of only the pure solvent 18 (illustrated with circles) flowing through the test cell 22 with a first probe beam 626A from the laser source 24 (illustrated in FIG. 1) directed at the test cell 22 and a first detected beam 630A exiting the test cell 22 that is detected by the detector system 28. In this example, the first probe beam 626A has an initial intensity $I_0$ and the first detected beam 630A has a solvent detector intensity of $I_{solvent}$ as a result of the absorbance of the light by the molecules of the pure solvent 18.

In this embodiment, the first probe beam 626A has a center wavelength in the MIR range. It should be noted that the center wavelength of the first probe beam 626A is varied over time (during a first time period) over the target wavelength range. Further, the solvent detector intensity $I_{solvent}$ will vary during the first time period with respect to the wavelength of the first probe beam 626A based the absorbance characteristics of the pure solvent 18.

With this design, as the wavelength of the first probe beam 626A is varied to each target wavelength during the first time period, the detector system 28 can capture one or more separate solvent detector intensities for each target wavelength. Subsequently, the control and analysis system 28 can use the separate solvent detector intensities to generate a solvent intensity spectrum $f(I_{solvent})$ which represents the solvent intensity $I_{solvent}$ as a function of wavelength over the target wavelength range.

Figure 6B:
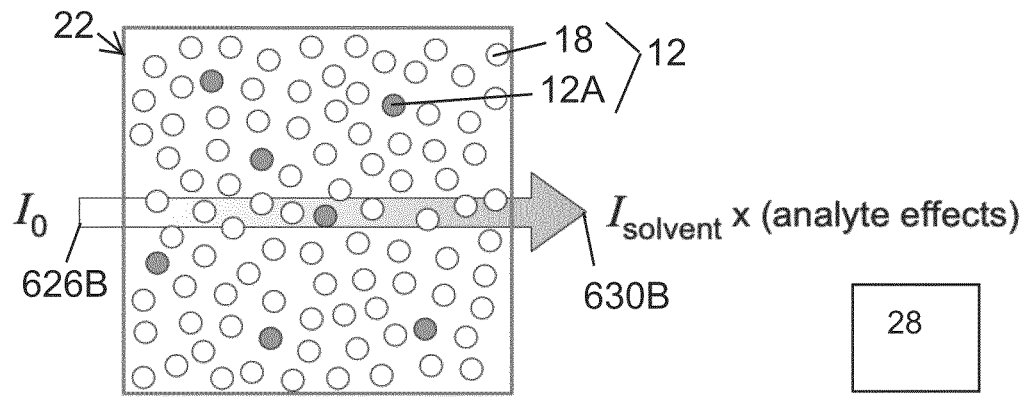
FIG. 6B is a simplified schematic of a sample in the test cell with the probe beam and the detected beam.

FIG. 6B is a simplified schematic of the sample 12 that includes the sample 12 flowing through the test cell 22 with a second probe beam 626B from the laser source 24 (illustrated in FIG. 1) directed at the test cell 22 and a second detected beam 630B exiting the test cell 22 that is detected by the detector system 28. In this simplified example, the sample 12 is made up of a mixture of the solvent 18 and one or more analyte(s) 12A (illustrated with filled in circles). Further, in this example, the second probe beam 626B has an initial intensity $I_0$ and the second detected beam 630B has a sample detector intensity of $I_{sample}$ as a result of the absorbance of the light by the molecules of the sample 12. It should be noted that $I_{sample}$ can also be referred to as $I_{solvent}$ x (analyte effects) because the intensity is influenced by the solvent and the analytes in the flow cell.

In this embodiment, the second probe beam 626B has a center wavelength in the MIR range. Further, the center wavelength of the second probe beam 626B is varied over time (during a second time period) over the same target wavelength range. As a result thereof, the sample detector intensity $I_{sample}$ will vary with respect to the wavelength of the second probe beam 626B during the second time period, based the absorbance characteristics of the sample 12. It should be noted that the second probe beam 626B can have the same wavelength profile as the first probe beam 626A.

With this design, as the wavelength of the second probe beam 626B is varied to each target wavelength during the second time period, the detector system 28 can capture one or more separate sample detector intensities for each target wavelength. Subsequently, the control and analysis system 32 can use the separate sample detector intensities to generate a sample intensity spectrum $f(I_{sample})$ which represents the sample intensity $I_{sample}$ as a function of wavelength over the target wavelength range.

As provided herein, FIGS. 6A and 6B schematically illustrate a method for analyzing the sample 12 via light transmission by first analyzing the pure solvent 18 (FIG. 6A), and subsequently analyzing the sample 12 including the solvent. Basically, the presence of the analyte 12A modifies the transmission of light through the solvent 18 by a factor labeled "analyte effects" in FIG. 6B. Stated in another fashion, the presence of the analyte 12A modifies the amount of light transmitted through the liquid, based on the volume and characteristics of the analyte 12A.

In one embodiment, when the Beer-Lambert law is applied to the situation in FIGS. 6A and 6B, the path length $\ell$ is considered a constant for this measurement, the absorbance cross-section of the solvent ($\sigma_{solvent}$) is considered a constant, and the absorbance cross-section of the analyte ($\sigma_{analyte}$) is considered a constant. Therefore, the measured absorbances are proportional to the concentrations of the solvent ($n_{solvent}$) and the analyte ($n_{analyte}$) alone. The Beer-Lambert equation can be written for the pure solvent 18 situation illustrated in FIG. 6A as follows:

$$I_{solvent} = I_0 \exp[-A_{solvent}]. \quad \text{Equation 3}$$

Thus, the solvent detector intensity can be calculated using the initial intensity and the absorbance of the solvent ($A_{solvent}$).

For many solvents 18, the attenuation of light is significant, such that $I_{solvent}$ is a small fraction (1% or less) of $I_0$ for path lengths of even a few tens of micrometers. Now consider the addition of an analyte 12A to the solvent 18, shown schematically in FIG. 6B. The analyte 12A has its own absorbance ($A_{analyte}$). Further, the analyte 12A also modifies the absorbance of the solvent ($A_{modified\ solvent}$) due to the analyte 12A displacing some of the solvent molecules. Stated in another fashion, because of the addition of the analyte 12A in FIG. 6B, there are fewer solvent molecules in the test cell 22 in FIG. 6B as compared to the number of solvent molecules in the test cell 22 of FIG. 6A. The effect on absorbance of the fewer solvent molecules (when comparing FIGS. 6A and 6B) can be categorized as the modified solvent absorbance ($A_{modified\ solvent}$).

The Beer Lambert equation can now be modified as follows:

$$I_{sample} = I_0 \exp[-(A_{modified\ solvent} + A_{analyte})] \quad \text{Equation (4)}$$

The modified solvent absorbance ($A_{modified\ solvent}$) can be broken down as follows:

$$A_{modified\ solvent} = \ell\, \sigma_{solvent}(n_{solvent} - n_{displaced\ solvent}) \quad \text{Equation (5A)}$$

$$A_{modified\ solvent} = A_{solvent} - A_{displaced\ solvent} \quad \text{Equation (5B)}$$

where (i) $\ell$ is the path length; (ii) $\sigma_{solvent}$ is absorbance cross section of the solvent; (iii) $n_{solvent}$ is the solvent molecule concentration; (iv) $n_{displaced\ solvent}$ is the displaced solvent molecule concentration; and (v) $A_{displaced\ solvent}$ is the absorbance of the displaced solvent.

Using math, plugging Equation (5B) into Equation (4), and then using Equation (3), the following Equations are obtained:

$$I_{sample} = I_0 \exp[-A_{solvent}] \exp[-(A_{analyte} - A_{displaced\ solvent})] \quad \text{Equation (6)}$$

$$I_{sample} = I_{solvent} \exp[-(A_{analyte} - A_{displaced\ solvent})] \quad \text{Equation (7)}$$

In Equation (7) the sample detector intensity is equal to the solvent detector intensity times the exponential term which includes the analyte absorbance ($A_{analyte}$) minus the displaced solvent absorbance ($A_{displaced\ solvent}$).

Complications of the above analysis can occur when the solvent and analyte interactions significantly alter the solvent spectrum, or higher concentration of analyte alter the analyte spectrum itself. However, in situations where the sample contains only trace amounts of analyte, these effects are negligible and can be ignored.

The results of Equation (7) lead to a different measurement paradigm for optically interrogating trace amounts of analytes in solution. This unique measurement paradigm allows for the analysis of the sample to be performed using a solvent that is highly absorbent to the wavelengths of the probe beam. Further, this unique method allows for the use of a high powered laser source, and a relatively long path length. These factors improve the sensitivity and accuracy of the spectroscopy system.

Further, the detector dynamic range of existing detector systems is not high enough to accurately measure both an initial intensity $I_0$ with only air in the test cell 22 (without the solvent or sample), and the sample intensity ($I_{sample}$) with the sample in the test cell 22 if the path length is very long and/or the solvent is highly absorbent. Stated in another fashion, the linear dynamic range and reserve of practical infrared detectors is not high enough to capture and analyze both the initial intensity $I_0$ in the absence of solvent or sample, and the sample intensity ($I_{sample}$) for the same optical path length. In contrast, with the present method, the difference in intensity between the solvent intensity and the sample intensity is easily within the dynamic range of existing detector systems 28, even with a long path length.

As provided herein, instead of measuring the total optical transmittance of the sample using the sample intensity divided by the initial intensity ($T=I/I_0$), the present invention calculates the solvent reference transmittance ($T_{solvent\ referenced}$) as provided below:

$$T_{solvent\ referenced} = I_{sample}/I_{solvent}. \quad \text{Equation (8)}$$

In Equation 8, the solvent referenced transmittance is calculated by dividing the sample intensity by the solvent intensity for each target wavelength. With this design, the transmittance is referenced to the solvent. It should be noted that a solvent referenced transmittance spectrum $f(T_{solvent\ referenced})$ which represents the solvent referenced transmittance as a function of wavelength over the target wavelength range can be generated using the information from the sample intensity spectrum $f(I_{sample})$ and the solvent intensity spectrum $f(I_{solvent})$. Alternatively or additionally, a solvent referenced Absorbance spectrum $f(A_{solvent\ referenced})$ which represents the solvent referenced absorbance as a function of wavelength over the target wavelength range can be generated using the information from the sample intensity spectrum $f(I_{sample})$ and the solvent intensity spectrum $f(I_{solvent})$.

It should also be noted that the method used in Equation 8 solves the problem of transmittance noise. More specifically, since the change in intensity due to analyte effects is small compared to the total attenuation in intensity due to the long path through the solvent, the quantity in Equation 8 has high enough transmittance values to offer usable signal to noise ratio for the calculated absorbance. In certain embodiments, this solvent referenced transmittance ($T_{solvent\ referenced}$) is typically >0.1 for a wide range of useful trace additions of analytes, resulting in excellent signal to noise in the measured absorbance.

As provided herein, using math and combining Equations 2 and 7 to Equation 8 results in the following relationship:

$$A_{analyte} - A_{displaced\ solvent} = \ln(1/T_{solvent\ referenced}). \quad \text{Equation (9)}$$

In Equation 9, and elsewhere, $A_{analyte}$ represents combined analyte absorbance of the analytes in the sample.

Importantly, Equation 9 can be extended to multiple analytes at the trace level to obtain:

$$A_{analyte1} + A_{analyte2} + A_{analyte3} + \ldots - A_{displaced\ solvent} = \ln(1/T_{solvent\ referenced}). \quad \text{Equation (10)}$$

In Equation 10, and elsewhere, (i) $A_{analyte1}$ represents a first analyte absorbance; (ii) $A_{analyte2}$ represents a second analyte absorbance; (iii) $A_{analyte3}$ represents a third analyte the absorbance; and (iv) $A_{displaced\ solvent}$ represents the displaced solvents absorbance. In this way, the solvent referenced transmittance ($T_{solvent\ referenced}$) can be used to calculate the absorbance, which can be decomposed into a linear combination of infrared spectra of the different analyte spectra, and a solvent correction spectrum that is the same as the pure solvent, but negative going because solvent has been displaced by the analytes. In certain embodiments, when the solvent referenced transmittance ($T_{solvent\ referenced}$) is greater than 0.10, there is adequate signal to noise ratio in the calculated absorbance to benefit from the long path lengths, and obtain sensitivities to trace analytes from percent levels down to the part-per-million level.

It should be noted that the data from the solvent reference transmittance spectrum $f(T_{solvent\ referenced})$ can be used to calculate (i) a first analyte absorbance spectrum $f(A_{analyte1})$ which represents the first analyte absorbance as a function of wavelength over the target wavelength range; (ii) a second analyte absorbance spectrum $f(A_{analyte2})$ which represents the second analyte absorbance as a function of wavelength over the target wavelength range; and (iii) a third analyte absorbance spectrum $f(A_{analyte3})$ which represents the third analyte absorbance as a function of wavelength over the target wavelength range. The first analyte absorbance spectrum can be used to identify and determine the concentration of the first analyte. Further, the second analyte absorbance spectrum can be used to identify and determine the concentration of the second analyte. Similarly, the third analyte absorbance spectrum can be used to identify and determine the concentration of the third analyte.

As provided herein, using Equation 10, the above process can be extended to analyze samples of multiple analytes. This analysis then returns a linear combination of absorbance spectra for the different species, plus a negative going solvent spectrum from the displaced solvent.

Two, non-exclusive examples to deal with the displaced solvent effect when calculating the absorbance from the solvent referenced transmittance ($T_{solvent\ referenced}$) are provided herein. In a first example, the solvent spectrum can be included as part of analysis, either through linear least squares fitting or by monitoring a spectral region of the solvent without analyte absorbances. In this example, a test cell with a short path length can be used to obtain an initial intensity with only air in the test cell, and a solvent intensity with the solvent in the test cell. Using the initial intensity and the solvent intensity, the transmission and absorbance spectrum of the solvent can be determined, and subsequently used to calculate the displaced solvent effect for subsequent measurements with a longer path length test cell.

In a second example, the displaced solvent effect can be included with the analyte spectrum, creating a spectrum that has negative going components. Since the volume of solvent displaced should be relatively constant with varying amounts of trace analyte, this negative going component can be considered to be part of the analyte spectrum in the solvent (when calculated using solvent referenced transmittance ($T_{solvent\ referenced}$)), and hence will still result in accurate concentration measurements without having to explicitly correct for the displaced solvent spectrum.

The technique of measuring solvent referenced transmittance ($T_{solvent\ referenced}$) has several advantages. First and foremost, this technique allows analysis of multiple analytes through the acquisition of complete spectra. Solvent effects can be easily accounted for by inclusion of the absorbance spectrum for the displaced solvent. It also allows the system to work as a general purpose spectrometer, acquiring spectra of unknowns without any reference to a standard. Acquisition times of spectra are not limited by the slow nature of the modulation technique, but only by the speed of tuning of the laser source 24 and the detector system 28. In certain alternative embodiments, the spectroscopy system 10 can acquire a complete spectra can be in less than ten milliseconds, one hundred milliseconds, or one second with standard swept laser techniques, as opposed to tens of seconds or even minutes for modulation techniques.

Also, solvent intensity ($I_{solvent}$) spectrum can be acquired once at the beginning of a measurement, and if the system 10 has been designed for relative stability, then there is no need for sample 12 modulation at all, since slow evolution of the sample 12 can be monitored through solvent referenced transmittance ($T_{solvent\ referenced}$). This is especially critical for monitoring cell culture growth media or bioreactors, where trace analyte concentration measurements are required over time scales of minutes to hours, but there is no fast modulation of the sample 12. Finally, the spectroscopy system 10 also simplifies the acquisition and analysis of difference spectra. The solvent referenced transmittance ($T_{solvent\ referenced}$) can be acquired at any time in the measurement, and the subsequent calculated absorbance will be sensitive to only changes in the analytes 12A, 12B, 12C, and sample 12.

In summary, the present invention first generates the solvent intensity spectrum for the pure solvent. With reference to FIG. 6A, the solvent intensity at each target wavelength (the solvent intensity spectrum) can be acquired by flowing the solvent through the test cell 22 while directing the probe beam 626A that is rapidly tuned over time through the target wavelength range and recording the solvent intensity of the detected beam 630A during the first time period. The solvent intensity spectrum can be archived, and then used to calculate the solvent referenced transmittance spectrum.

Subsequently, the present invention generates the sample intensity spectrum for the sample. With reference to FIG. 6B, the sample intensity at each target wavelength (the sample intensity spectrum) can be acquired by flowing the sample 12 through the test cell 22 while directing the probe beam 626B tuned over time through the target wavelength range and recording the sample intensity of the detected beam 630B during the second time period.

Subsequently, using Equation (8), the solvent reference transmittance at each target wavelength (solvent referenced transmittance spectrum) can be calculated.

Next, the displaced solvents absorbance spectrum and the displaced solvent contribution to the referenced solvent transmittance can be calculated. For example, a component analysis (such as linear least squares fitting) can be used to determine the displaced solvent contribution. Alternatively, the displace solvents effects can be determined by recording a spectrum in a region where the analytes have no or very weak spectral features, then looking at the change in absorbance and taking it as due entirely to displaced solvent such that this displaced solvent spectrum can be added back in to spectral regions where the analytes do have stronger absorbance features. Each analyte will displace the same amount of solvent, so including this constant displaced solvent spectrum in with the analyte spectrum allows the resultant spectrum to be used in a component analysis such as linear least squares fitting to accurately determine analyte concentrations without having to further consider the displaced solvent spectrum.

Subsequently, using Equation (10), the analyte absorbances over the target wavelength range (analyte absorbance spectrum) of one or more of the analytes can be determined. Each analyte absorbance spectrum can be used to identify and determine the concentration of the analyte in the sample.

Figure 7:
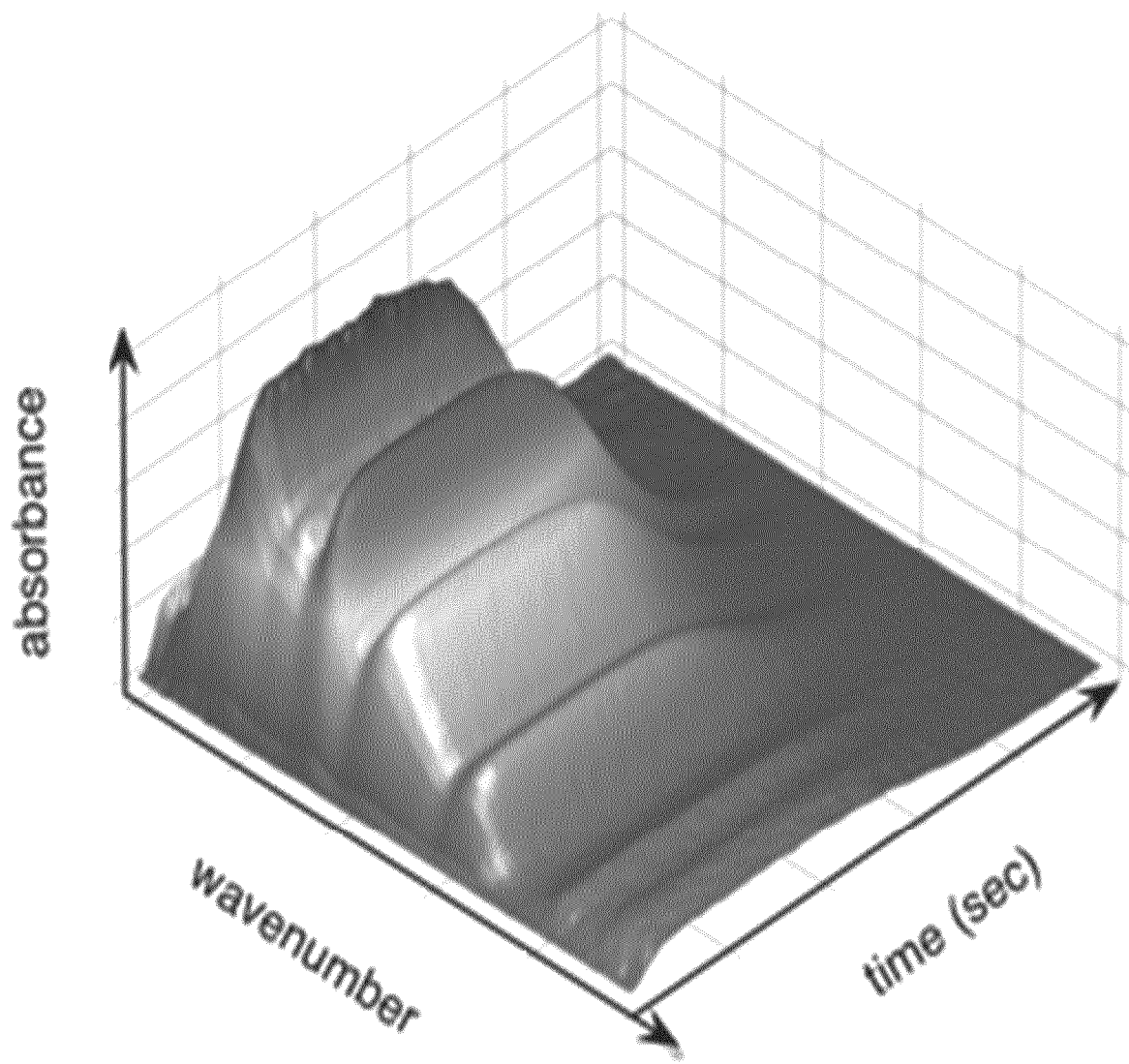
FIG. 7 is a graph that illustrates an absorbance spectrum of glucose versus time calculated using the spectroscopy system of FIG. 1.

FIG. 7 is a graph that illustrates a glucose absorbance spectrum calculated based on the solvent referenced transmittance ($T_{solvent\ referenced}$) as the sample of glucose and water (solvent) flows through the flow cell over time. As illustrated in FIG. 7, at the beginning of test time, the glucose absorbance is zero because only the solvent is flowing through the flow cell, and the analyte absorbance is referenced to the transmittance of the solvent. Subsequently in time, when the glucose is mixed with the water, the glucose absorbance spectrum can be calculated using the solvent referenced transmittance ($T_{solvent\ referenced}$). Later in time, the solvent only is again flowing in the test cell and the glucose absorbance spectrum returns to zero.

It should be noted that the profile of the glucose absorbance spectrum is unique to glucose and can be used to identify the analyte as glucose. Further, the magnitude of the glucose absorbance spectrum can be used to estimate the concentration.

Figure 8:
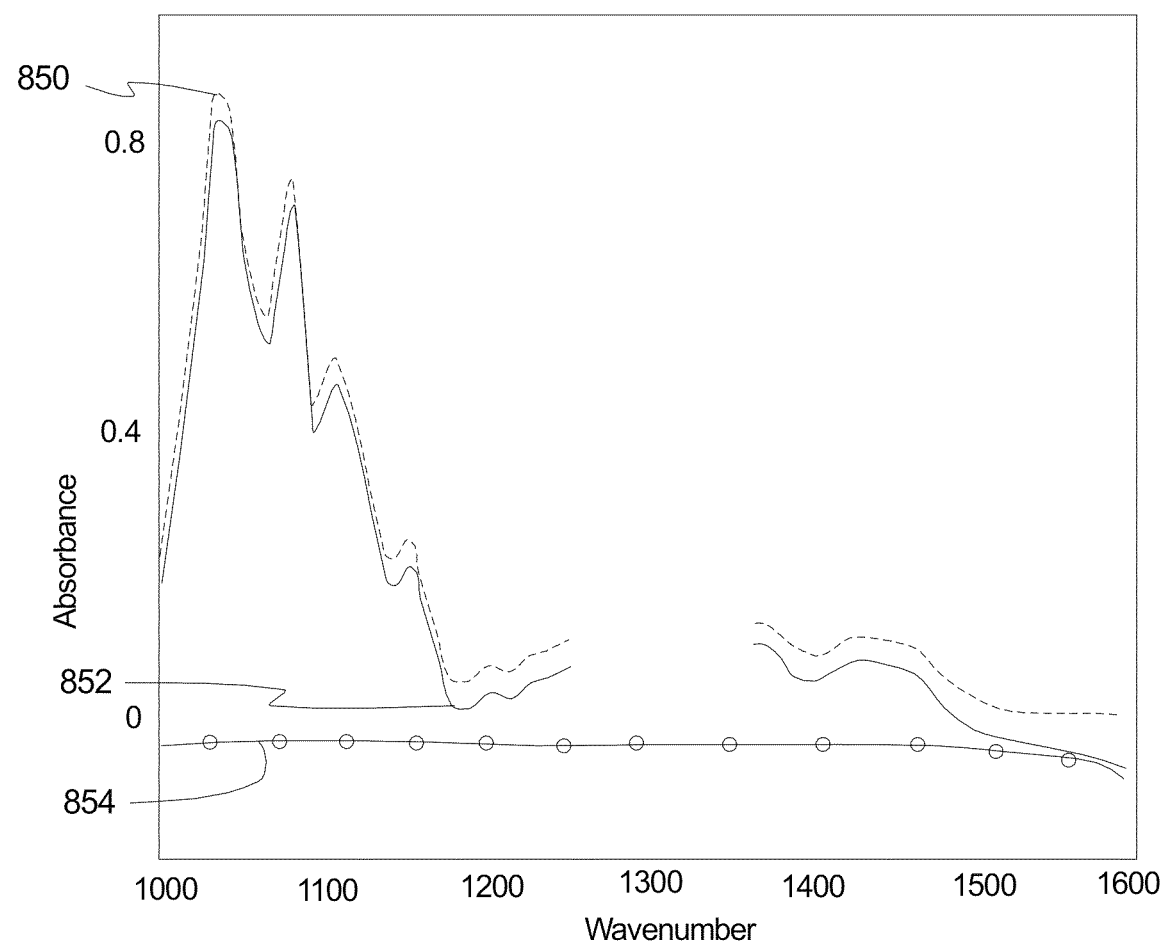
FIG. 8 is a graph that illustrates an absorbance spectrum for glucose, a recorded absorbance spectrum, and the absorbance spectrum for displaced solvent.

In this example, the spectroscopy system 10 was used to analyze a sample of 20 g/L glucose (analyte) in a solvent of water. FIG. 8 is a graph that illustrates an analyte absorbance spectrum 850 (short dashes) for the glucose alone, a solvent referenced absorbance spectrum 852 (solid line), and the displaced solvent absorbance spectrum 854 (solid line with circles). In this example, the glucose (analyte) absorbance spectrum 850 is calculated based on the solvent reference transmittance spectrum and the displaced solvent absorbance spectrum 854. The displaced solvent absorbance spectrum 854 exhibits a negative absorbance for the 1500 to 1600 cm$^{-1}$ range.

The actual pure glucose absorbance spectrum 850 is not negative going, but because solvent referenced transmittance ($T_{solvent\ referenced}$) contains contributions from the displaced solvent, there is a negative going displaced solvent absorbance spectrum 854 that is due to displaced solvent, i.e., less solvent (e.g. water) is traversed by the beam as compared to the pure solvent. Where the glucose spectrum has stronger absorbance pure unit volume than the solvent, the net spectrum will be positive going. Elsewhere it will be negative, as demonstrated. It should be noted that FIG. 8 includes a spectral gap from 1250 to 1350 cm$^{-1}$ due to incomplete spectral coverage of laser source (e.g. the laser source includes a first laser (not shown) that rapidly tunes from approximately 1000-1250 wavenumbers and a second laser (not shown) that rapidly tunes from approximately 1350-1600 wavenumbers).

Figure 9:
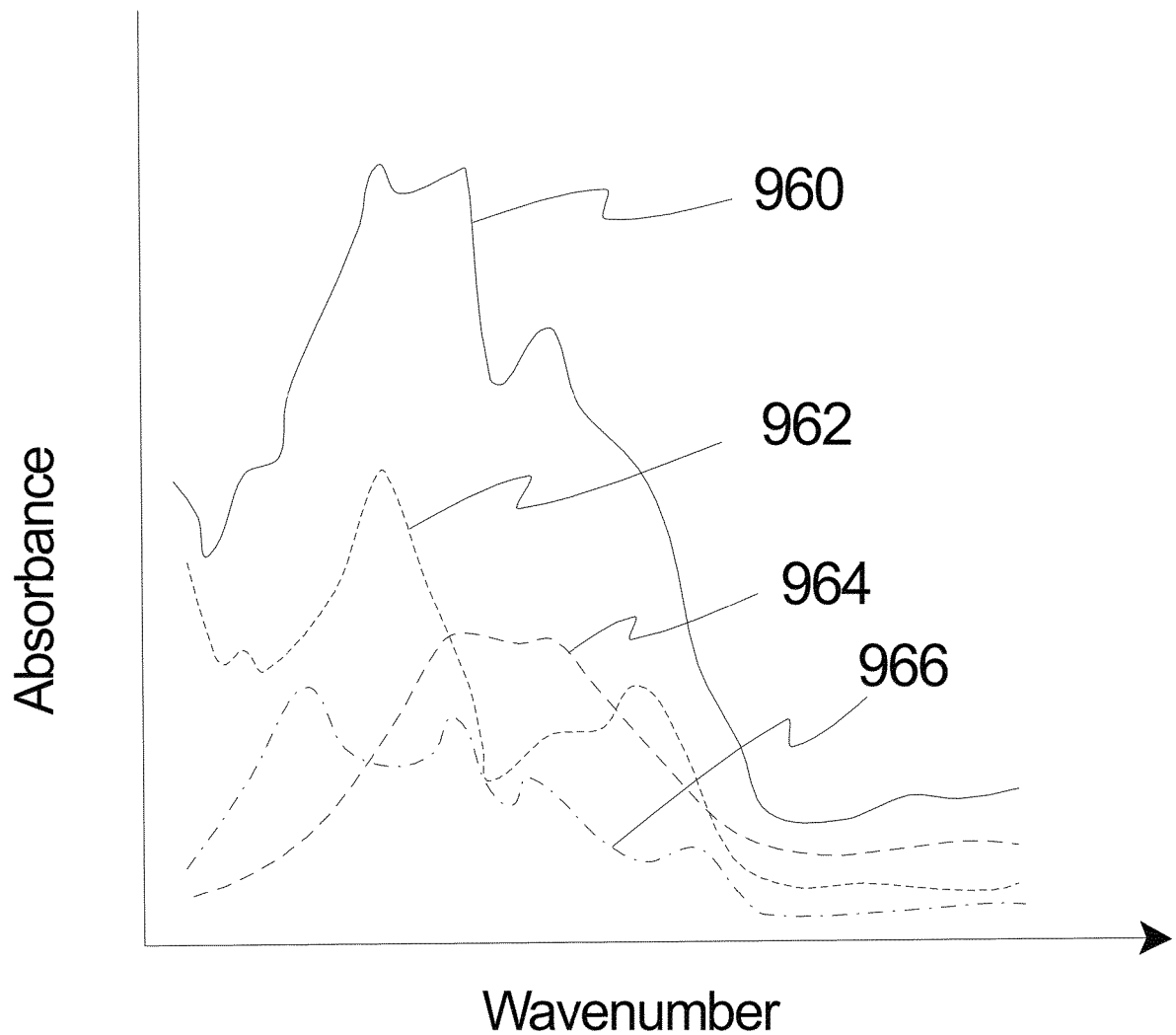
FIG. 9 is a graph that illustrates an absorbance spectrum for a sample, an absorbance spectrum for a first analyte, an absorbance spectrum for a second analyte, and an absorbance spectrum for a third analyte.

FIG. 9 is a graph that illustrates the absorbance spectrum for another sample that was tested using the spectroscopy system 10 provided herein. In this embodiment, (i) curve 960 (solid line) represents a total analyte absorbance spectrum of the analytes, (ii) curve 962 (short dashed line) represents a first analyte absorbance spectrum for a first analyte; (iii) curve 964 (long dashed line) represents a second analyte absorbance spectrum for a second analyte; and (iv) curve 966 (dot-dashed line) represents a third analyte absorbance spectrum for a third analyte. It should be noted that each of the analyte spectrums 962, 964, 966 can be generated from the total analyte absorbance spectrum 960 using chemometrics. For example, one way is to use a least squares fitting algorithm with known spectra (recorded as individual analytes) to generate the analyte spectrums 962, 964, 966 from the total analyte absorbance spectrum 960.

It should be noted that the first analyte absorbance spectrum 962 can be used to identify and determine the concentration (based on amount of absorbance) of the first analyte. Further, the second analyte absorbance spectrum 964 can be used to identify and determine the concentration (based on amount of absorbance) of the second analyte. Similarly, the third analyte absorbance spectrum 966 can be used to identify and determine the concentration (based on amount of absorbance) of the third analyte.

With reference back to FIG. 1, as provided herein, to defeat the etaloning and coherence effects that are common in small volume flow cells and optical systems, the control and analysis system 32 can controls the laser source 24 and/or the detector system 28 so that the laser source 24 effectively does not have sharp intensity peaks at one or more wavelengths in the tunable range.

In one, non-exclusive embodiment, the present invention uses fast wavelength modulation of the probe beam 26 during the capture time of the detector system 28. In this embodiment, for example, for each target wavelength, the control and analysis system 32 can control the frequency selective element 24E to quickly dither the wavelength around and through the respective target wavelength during the capture time for each respective target wavelength.

The number of cycles in which the wavelength is dithered near each target wavelength during the respective capture time can vary. As non-exclusive examples, the number of cycles can be approximately 1, 2, 3, 4, 5, 10, 20, 40, 50, 100, or more cycles during the capture time for each respective target wavelength.

Further, the amplitude of each cycle at each target wavelength can also be varied. As non-exclusive examples, the amplitude of each cycle can be approximately plus or minus 1, 2, 3, 4, 5, 10, or 20 wavelengths (relative to the target wavelength).

In this example, the control and analysis system 32 controls the laser source 24 to provide fast wavelength modulation around each target wavelength and controls the detector system 28 to have relatively slow capture times at each target wavelength. This results in real-time detector averaging that defeats the etaloning and coherence effects that are common in small volume flow cells and optical systems, and effectively eliminates the sharp intensity peaks at one or more wavelengths in the tunable range. A related discussion on fast wavelength modulation can be found in U.S. Pat. No. 10,437,033. As far as permitted, the contents of U.S. Pat. No. 10,437,033 are incorporated herein by reference.

An alternative way to defeat the etaloning and coherence effects includes averaging a plurality of preliminary transmittance measurements for each target wavelength. In this example, for each target wavelength, the detector system 28 captures a plurality of preliminary measurements, with each preliminary measurement being captured at a different center wavelength that is near the respective target wavelength. Subsequently, for each target wavelength, the plurality of preliminary measurement are combined to generate the final measurement for the respective target wavelength.

Because a plurality of preliminary measurements are combined for each target wavelength, the laser source 24 effectively does not have sharp intensity peaks at one or more wavelengths in the tunable range.

The number of preliminary measurements for each target wavelength can vary. As non-exclusive examples, 2, 3, 4, 5, 6, 7 or 8 preliminary images can be used for each target wavelength.

The method used to combine the multiple preliminary measurements for each target wavelength can vary. In one, non-exclusive embodiment, the multiple preliminary measurements can be passed through a low-pass filter. As non-exclusive examples, the low-pass filter can utilize either a running average or Gaussian filter, and optionally followed by sub-sampling through decimation. A related discussion on combining multiple preliminary measurements can be found in U.S. Pat. No. 9,784,958. As far as permitted, the contents of U.S. Pat. No. 9,784,958 are incorporated herein by reference.

In summary, to combat this etaloning, it is desirable to not have a laser with a sharp intensity peak at one wavelength, but instead a laser with a broader intensity peak over several continuous wavelengths. This serves to average over the etaloning or coherence effects. Broad wavelength ranges of 2, 4, 8, 10, 12, 14, 16, 18, and 20 $cm^{-1}$ are advantageous, since they are comparable in spectral width to the spectral features of most solvents and analytes. To achieve this broad wavelength spread, the laser is tuned over one of these ranges and then the wavelengths averaged together. Similarly, the laser wavelength can be rapidly (compared to the timescale of acquiring a single wavelength measurement) dithered over this range of wavelengths to create an averaging effect as well.

It is understood that although a number of different embodiments of a spectroscopy system 10 have been illustrated and described herein, one or more features of any one embodiment can be combined with one or more features of one or more of the other embodiments, provided that such combination satisfies the intent of the present invention.

While the particular spectroscopy system 10 as herein shown and disclosed in detail is fully capable of obtaining the objects and providing the advantages herein before stated, it is to be understood that it is merely illustrative of some of the presently preferred embodiments of the invention and that no limitations are intended to the details of construction or design herein shown other than as described in the appended claims.

What is claimed is:

1. A method for analyzing a sample that includes one or more analytes and a solvent, the method comprising:
   providing a test cell;
   directing the solvent into the test cell at a substantially constant flow rate;
   directing a first laser probe beam from a tunable laser source at the test cell while the solvent is flowing at the substantially constant flow rate in the test cell, wherein a center wavelength of the first laser probe beam is varied over time over at least a portion of a mid-infrared wavelength range by tuning the laser source while the solvent is flowing at the substantially constant flow rate in the test cell;
   acquiring a solvent intensity spectrum for the solvent while the first laser probe beam with the varying center wavelength is directed at the test cell;
   directing the sample into the test cell at a substantially constant flow rate;
   directing a second laser probe beam from the tunable laser source at the test cell while the sample is flowing at the substantially constant flow rate in the test cell, wherein a center wavelength of the second laser probe beam is varied over time over at least the portion of the mid-infrared wavelength range by tuning the laser source while the sample is flowing at the substantially constant flow rate in the test cell in the test cell;
   acquiring a sample intensity spectrum of the sample while the second laser probe beam with the varying center wavelength is directed at the test cell; and
   analyzing the sample using the solvent intensity spectrum and the sample intensity spectrum with a control and analysis system.

2. The method of claim 1 wherein analyzing includes calculating a solvent referenced transmittance spectrum that details a solvent referenced transmittance as a function of wavelength using the solvent intensity spectrum and the sample intensity spectrum.

3. The method of claim 2 wherein analyzing includes identifying at least one analyte using the solvent referenced transmittance spectrum.

4. The method of claim 3 wherein identifying includes calculating a displaced solvent absorbance spectrum and calculating an analyte absorbance spectrum that details the absorbance of the analyte as a function of wavelength using the solvent referenced transmittance spectrum and the displaced solvent absorbance spectrum.

5. The method of claim 4 wherein the analyte absorbance spectrum is a linear combination of one or more of the analytes.

6. The method of claim 2 further comprising calculating a displaced solvent absorbance spectrum, and calculating a displaced solvent contribution to the solvent referenced solvent transmittance.

7. The method of claim 6 wherein calculating a displaced solvent absorbance spectrum includes utilizing a component analysis to determine the displaced solvent absorbance spectrum.

8. The method of claim 6 wherein calculating a displaced solvent absorbance spectrum includes recording a spectrum in a region where the analytes have no or very weak spectral features, then looking at the change in absorbance and taking it as due entirely to displaced solvent such that this displaced solvent spectrum can be added back in to spectral regions where the analytes do have stronger absorbance features.

9. The method of claim 6 further comprising taking solvent effects into account by combining them with each analyte spectrum.

10. The method of claim 1 wherein analyzing includes calculating a solvent referenced absorbance spectrum that details a solvent referenced absorbance as a function of wavelength using the solvent intensity spectrum and the sample intensity spectrum.

11. A spectroscopy system for analyzing a sample that includes one or more analytes and a solvent, the spectroscopy system comprising:
a test cell;
a tunable laser source that (i) directs a first laser probe beam at the test cell while the solvent is flowing in the test cell at a substantially constant flow rate, wherein a center wavelength of the first laser probe beam is varied over time over at least a portion of a mid-infrared wavelength range by tuning the laser source while the solvent is flowing at the substantially constant flow rate in the test cell; and (ii) directs a second laser probe beam at the test cell while the sample is flowing in the test cell at a substantially constant flow rate, wherein a center wavelength of the second laser probe beam is varied over time over at least the portion of the mid-infrared wavelength range by tuning the laser source while the solvent is flowing at the substantially constant flow rate in the test cell;
a detector system that (i) acquires a solvent intensity spectrum for the solvent while the first laser probe beam with the varying center wavelength is directed at the test cell; and (ii) acquires a sample intensity spectrum of the sample while the second laser probe beam with the varying center wavelength is directed at the test cell; and
a control and analysis system that analyzes the sample using the solvent intensity spectrum and the sample intensity spectrum.

12. The spectroscopy system of claim 11 wherein the control and analysis system calculates a solvent referenced transmittance spectrum that details a solvent referenced transmittance as a function of wavelength using the solvent intensity spectrum and the sample intensity spectrum.

13. The spectroscopy system of claim 12 wherein the control and analysis system uses the sample referenced transmittance spectrum to identify at least one analyte in the sample.

14. The spectroscopy system of claim 13 wherein the control and analysis system calculates a displaced solvent absorbance spectrum and calculates an analyte absorbance spectrum that details the absorbance of the analyte as a function of wavelength using the solvent referenced transmittance spectrum and the displaced solvent absorbance spectrum.

15. The spectroscopy system of claim 14 wherein the analyte absorbance spectrum is a linear combination of one or more of the analytes.

16. The spectroscopy system of claim 12 wherein the control and analysis system calculates a displaced solvent absorbance spectrum, and calculates a displaced solvent contribution to the solvent referenced solvent transmittance.

17. The spectroscopy system of claim 16 wherein the control and analysis system calculates the displaced solvent absorbance spectrum utilizing a component analysis to determining the displaced solvent absorbance spectrum.

18. The spectroscopy system of claim 16 wherein the control and analysis system calculates the displaced solvent absorbance spectrum by recording a spectrum in a region where the analytes have no or very weak spectral features, then looking at the change in absorbance and taking it as due entirely to displaced solvent such that this displaced solvent spectrum can be added back in to spectral regions where the analytes do have stronger absorbance features.

19. The spectroscopy system of claim 11 wherein the control and analysis system calculates a solvent referenced absorbance spectrum that details a solvent referenced absorbance as a function of wavelength using the solvent intensity spectrum and the sample intensity spectrum.

20. The spectroscopy system of claim 11 wherein the detector system acquires (i) the solvent intensity spectrum without modulation of the solvent, and (ii) the sample intensity spectrum without modulation of the sample.

21. The spectroscopy system of claim 11 wherein the portion of the mid-infrared wavelength range includes at least forty discrete target wavelengths.

22. The spectroscopy system of claim 11 wherein the tunable laser source (i) directs the first laser probe beam to sweep the portion of the mid-infrared wavelength range in less than one hundred seconds while the solvent is flowing at the substantially constant flow rate in the test cell; and (ii) directs the second laser probe beam to sweep the portion of the mid-infrared wavelength range in less than one hundred seconds while the sample is flowing at the substantially constant flow rate in the test cell.

23. The spectroscopy system of claim 1 wherein (i) acquiring a solvent intensity spectrum occurs without modulation of the solvent in the test cell; and (ii) acquiring a sample intensity spectrum occurs without modulation of the sample in the test cell.

24. The spectroscopy system of claim 1 wherein directing the first laser probe beam includes the portion of the mid-infrared wavelength range having at least forty discrete target wavelengths.

25. The spectroscopy system of claim 1 wherein directing the first laser probe beam includes sweeping the portion of the mid-infrared wavelength range in less than one hundred seconds while the solvent is flowing at the substantially constant flow rate in the test cell.

* * * * *